( 12 ) United States Patent
Ahmad et al.

(10) Patent No.: US 10,662,787 B2
(45) Date of Patent: May 26, 2020

(54) LOCAL TWO-LAYER THERMAL BARRIER COATING

(71) Applicant: Siemens Aktiengesellschaft, Munich (DE)

(72) Inventors: Fathi Ahmad, Kaarst (DE); Daniela Koch, Berlin (DE); Radan Radulovic, Bochum (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/776,920

(22) PCT Filed: Nov. 2, 2016

(86) PCT No.: PCT/EP2016/076361
§ 371 (c)(1),
(2) Date: May 17, 2018

(87) PCT Pub. No.: WO2017/089082
PCT Pub. Date: Jun. 1, 2017

(65) Prior Publication Data
US 2018/0334914 A1 Nov. 22, 2018

(30) Foreign Application Priority Data
Nov. 27, 2015 (DE) .......................... 10 2015 223 576

(51) Int. Cl.
*F01D 5/28* (2006.01)
*C23C 28/00* (2006.01)
*B32B 18/00* (2006.01)

(52) U.S. Cl.
CPC .............. *F01D 5/288* (2013.01); *B32B 18/00* (2013.01); *C23C 28/3215* (2013.01);
(Continued)

(58) Field of Classification Search
CPC ..... F01D 5/286; F01D 5/288; C23C 28/3455; C23C 28/3215; B23B 18/00;
(Continued)

(56) References Cited

U.S. PATENT DOCUMENTS 6,106,231 A * 8/2000 Brainch .................. F01D 5/20
29/527.2
7,306,859 B2 * 12/2007 Wortman .................. C23C 4/04
416/241 B
(Continued)

FOREIGN PATENT DOCUMENTS

CN 101522949 A 9/2009
CN 101522949 B 12/2011
(Continued)

OTHER PUBLICATIONS

International Search Report dated Jan. 20, 2017, for PCT/EP2016/076361.
(Continued)

*Primary Examiner* — David E Sosnowski
*Assistant Examiner* — Julian B Getachew
(74) *Attorney, Agent, or Firm* — Beusse Wolter Sanks & Maire

(57) ABSTRACT

A turbine blade with a ceramic thermal barrier coating system has a substrate designed as a blade platform and as a blade airfoil. On the substrate is a first ceramic layer as a thermal barrier coating, which protects the substrate in the exposed high temperature region and there is locally an increase of the thermal barrier coating for locally reinforcing the thermal barrier. The increase includes a material that is different from the material of the first ceramic layer. The local reinforcement is arranged over the first ceramic layer, without the first ceramic layer having a reduced layer thickness. The local reinforcement is provided at most on
(Continued)

30% of the area of the blade airfoil and is arranged close to a platform extending over the entire pressure side in the direction of flow and with an extent thereto in the radial direction of the blade airfoil is at most 30%.

18 Claims, 1 Drawing Sheet

(52) U.S. Cl.
CPC .... *C23C 28/3455* (2013.01); *C04B 2237/348* (2013.01); *C04B 2237/704* (2013.01); *C04B 2237/86* (2013.01); *F05D 2220/30* (2013.01); *F05D 2240/24* (2013.01); *F05D 2300/2118* (2013.01); *F05D 2300/611* (2013.01)

(58) Field of Classification Search
CPC ....... F05D 2300/611; F05D 2300/2118; F05D 2240/24; F05D 2220/30; C04B 2237/86; C04B 2237/348; C04B 2237/704
See application file for complete search history.

(56) References Cited

U.S. PATENT DOCUMENTS

| | | | |
|---|---|---|---|
| 8,172,520 B2 * | 5/2012 | Arrieta | F01D 5/18 415/177 |
| 2007/0134408 A1 | 6/2007 | Skoog et al. | |
| 2008/0160172 A1 * | 7/2008 | Taylor | C23C 4/02 427/9 |
| 2009/0148694 A1 | 6/2009 | Kaiser et al. | |
| 2009/0162539 A1 | 6/2009 | Boutwell et al. | |
| 2009/0311508 A1 | 12/2009 | Stamm | |
| 2010/0015401 A1 * | 1/2010 | Bolz | C23C 14/083 428/172 |
| 2010/0093516 A1 | 4/2010 | Malow et al. | |
| 2010/0297409 A1 | 11/2010 | Subramanian | |
| 2011/0038710 A1 * | 2/2011 | Kemppainen | F01D 5/288 415/115 |
| 2011/0135947 A1 | 6/2011 | Berndt et al. | |
| 2011/0256365 A1 | 10/2011 | Subramanian | |
| 2015/0322818 A1 | 11/2015 | Hannam et al. | |
| 2016/0024941 A1 | 1/2016 | Kaiser et al. | |
| 2016/0251971 A1 | 9/2016 | Düsterhöft et al. | |
| 2017/0298519 A1 | 10/2017 | Degel et al. | |

FOREIGN PATENT DOCUMENTS

| | | |
|---|---|---|
| DE | 10158639 A1 | 10/2002 |
| DE | 202006009526 U1 | 8/2006 |
| DE | 102009003898 A1 | 7/2010 |
| DE | 112008003399 T5 | 11/2010 |
| DE | 102014208216 A1 | 11/2015 |
| DE | 102014220359 A1 | 4/2016 |
| DE | 102014222686 A1 | 5/2016 |
| DE | 102014225130 A1 | 6/2016 |
| EP | 2236648 A1 | 10/2010 |
| EP | 1990330 B1 | 6/2011 |
| EP | 2845924 A1 | 3/2015 |
| EP | 2128306 B1 | 4/2015 |
| EP | 2865781 A1 | 4/2015 |
| JP | 2007007647 A | 1/2007 |
| JP | 2009522141 A | 6/2009 |
| JP | 2009542455 A | 12/2009 |
| JP | 2012140644 A | 7/2012 |
| WO | 2014108199 A1 | 7/2014 |

OTHER PUBLICATIONS

IPPR (PCT/IPEA/416 and 409) dated Nov. 14, 2017, for PCT/EP2016/076361.
DE Search Report dated Aug. 30, 2016, for DE patent application No. 102015223576.9.
Kumar et al, "Numerical simulation of steady state heat transfer in a ceramic-coated gas turbine blade", International Journal of Heat and Mass Transfer, vol. 45, Jan. 2002, pp. 4831-4845, XP055334651, DOI: 10.1016/S0017-9310(02)00190-4, Retrieved from the Internet: URL:http://www.sciencedirect.com/science/article/pii/S0017931002001904/pdfft?md5=6c130c84bcfeb4a19c08723762e76e30&pid=1-s2.0-S0017931002001904-main.pdf, pp. 4840, col. 1, lines 34-35, and col. 2.

* cited by examiner

LOCAL TWO-LAYER THERMAL BARRIER COATING

CROSS REFERENCE TO RELATED APPLICATIONS

This application is the US National Stage of International Application No. PCT/EP2016/076361 filed Nov. 2, 2016, and claims the benefit thereof. The International Application claims the benefit of German Application No. DE 102015223576.9 filed Nov. 27, 2015. All of the applications are incorporated by reference herein in their entirety.

FIELD OF INVENTION

The invention relates to a thermal barrier coating system with a thermal barrier coating, a two-layer thermal barrier coating being applied locally in a highly stressed region.

BACKGROUND OF INVENTION

Ceramic thermal barrier coatings (TBC) are used to protect components for use at high temperatures from heat input. This is the case with turbine blades. For example, EP 2 845 924 A1 discloses using coating systems comprising a first ceramic layer of fully or partly stabilized zirconia and on it a layer that has a pyrochlore structure, such as gadolinium zirconate.

Because of greater thermal stresses in the case of turbine blades of a turbine, there are local temperature peaks in the pressure region of the turbine blade. This leads to greater consumption of the metallic protective layer or to spalling of the TBC. The use of cooling air holes would lead to the consumption of compressor air, and consequently to a reduction of efficiency.

Without countermeasures, the maximum running time of the turbine would be reduced.

SUMMARY OF INVENTION

An object of the invention is therefore to solve the aforementioned problem.

The object is achieved by a coating system according to the claims.

BRIEF DESCRIPTION OF THE DRAWINGS

In the figures

The figures and the description only show exemplary embodiments of the invention.

DETAILED DESCRIPTION OF INVENTION

Figure 1:
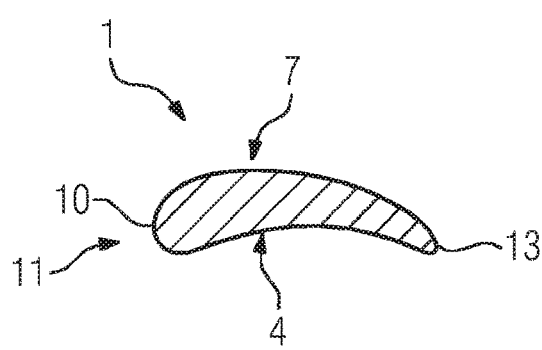
FIG. 1 shows a component with a coating system.

FIG. 1 shows a cross section through a blade airfoil of a turbine blade 1.

There is a suction side 7 and a pressure side 4, the turbine blade 1 being subjected to a flow of hot gas at an inflow edge 10 and having an outflow edge 13.

In the case of the turbine blade 1, there is a highly stressed region 22 in the region of the pressure side 4.

The turbine blade 1 is flowed around by a hot gas in the direction of flow 11.

Figure 2:
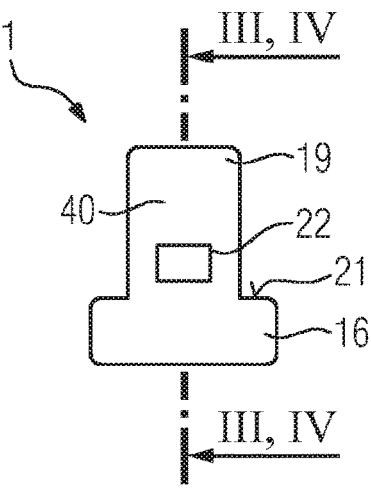
FIGS. 2 to 5 show various views of the configuration according to the invention.

FIG. 2 shows a plan view of a turbine blade 1, which has a blade airfoil 19 and a fastening region 16, shown simplified here.

Figure 3:
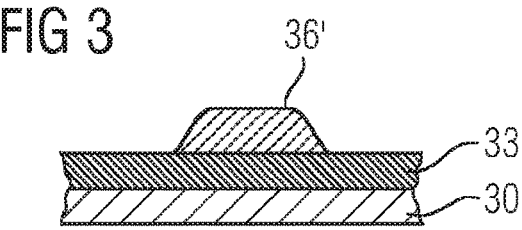
Figure 4:
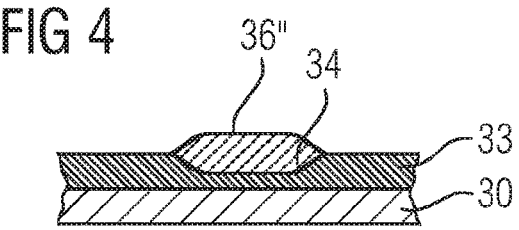
Figure 5:
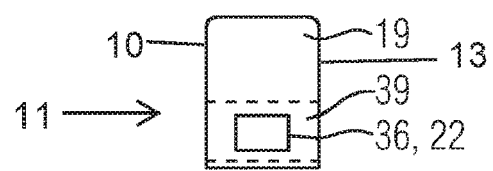

In a local region 22, there is increased thermal stress. In this region there is a local reinforcement 36, 36', 36" (FIGS. 3, 4 and 5).

The local reinforcement 36, 36', 36" is advantageously arranged close to a platform 21 and advantageously can extend with a transitional region 39 (FIG. 5) over the entire pressure side 4 in the direction of flow 11.

Perpendicularly or in a radial direction thereto, that is to say in the direction 40, the extent is a maximum of 50%, in particular at most 30%. In the case of a turbine blade 1, this figure advantageously relates only to the blade airfoil 19.

In order to allow for this increased thermal stress, the thickness of the thermal barrier coating is increased locally.

FIGS. 3 and 4 show cross sections of the configuration according to the invention.

The increase in the layer thickness does not take place as a result of increased application of the same material of the surrounding layer 33, but instead a second material, different from the first material, is applied locally.

The first ceramic layer 33 is arranged on the blade airfoil 19 and the blade platform 21 of a turbine blade 1.

Advantageously, the thermal barrier coating 33 on the turbine blade 1 is a zirconium-based layer, in particular a layer of partly stabilized zirconia, and the reinforced TBC is achieved by local application of a pyrochlore layer 36, 36', 36", in particular based on gadolinium zirconate.

The material of the local reinforcement 36, 36', 36" is advantageously also fully stabilized zirconia.

The material of the local reinforcement 36, 36', 36" is advantageously made to be at least 10%, in particular 20%, more porous than the first ceramic layer 33.

In particular, like the first ceramic layer 33, it 36, 36', 36" likewise comprises partly stabilized zirconia.

In this case, as shown in FIG. 3, the second material of the local reinforcement 36, 36', 36" may be applied to the underlying ceramic layer 33, that is to say the layer thickness of the thermal barrier coating 33 underneath the reinforcement 36' is just as thick as it is around the local reinforcement 36'.

Similarly, it is possible to make the underlying thermal barrier coating 33 somewhat thinner in the region of the local reinforcement 36", so that there is a recess 34, in which the other material is applied locally, to be precise is applied in such a way that a thickening is obtained (FIG. 4).

The first ceramic layer 33 advantageously has a thickness of 350 μm-500 μm.

The local reinforcement 36, 36', 36" advantageously has a thickness of up to 300 μm, in particular up to 250 μm.

Advantageously, the local reinforcement 36, 36', 36" is at least 10%, in particular at least 30%, thinner than the first ceramic layer 33.

FIG. 5 shows only a plan view of the blade airfoil region 19 of the component 1.

Between the region that has only the first thermal barrier coating 33 and the local reinforcement 36, 36', 36" (FIGS. 3 and 4) there may also be a transitional region 39, which has a gradient in the composition of the first ceramic layer 33 and the local reinforcement 36', 36".

The transitional region 39 likewise represents a local area.

The invention claimed is:

1. A turbine blade with a ceramic thermal barrier coating system, at least comprising:
   a substrate designed as a blade platform and as a blade airfoil, optionally a metallic bond coat on the substrate, wherein on the substrate or optionally on the metallic bond coat there is a thermal barrier coating comprising a first ceramic layer, which protects the substrate for the most part or completely in an exposed high temperature region and there is an increase of thickness in a portion of the thermal barrier coating comprising a second ceramic layer disposed on only a portion of the first ceramic layer and forming a reinforcement of the thermal barrier coating, wherein the second ceramic layer comprises a material composition that is different from a material composition of the first ceramic layer, wherein the reinforcement is arranged over the first ceramic layer, without the first ceramic layer having a reduced layer thickness, wherein the reinforcement is provided at most on 30% of an area of the blade airfoil and wherein the reinforcement is arranged close to a platform and extends over a pressure side of the airfoil in a direction of flow and with an extent thereto which in a radial direction of the blade airfoil is at most 30% of a full radial extent of the blade airfoil.

2. The turbine blade as claimed in claim 1, in which the material of the first ceramic layer comprises zirconia.

3. The turbine blade as claimed in claim 2, in which the material of the first ceramic layer comprises partially stabilized zirconia.

4. The turbine blade as claimed in claim 1, in which the material of the reinforcement comprises a pyrochlore.

5. The turbine blade as claimed in claim 4, in which the material of the reinforcement comprises gadolinium zirconate.

6. The turbine blade as claimed in claim 1, in which the material of the reinforcement comprises fully stabilized zirconia.

7. The turbine blade as claimed in claim 1, in which the material of the reinforcement is at least 10% more porous than that of the first ceramic layer.

8. The turbine blade as claimed in claim 7, in which the material of the reinforcement is at least 20% more porous than that of the first ceramic layer.

9. The turbine blade as claimed in claim 7, in which the material of the reinforcement comprises partly stabilized zirconia.

10. The turbine blade as claimed in claim 1, in which a transitional region in composition is present between the reinforcement and a region of the first ceramic layer surrounding the reinforcement.

11. The turbine blade as claimed in claim 1, in which the reinforcement is made at least 10% thinner than a portion of the first ceramic layer underlying the reinforcement.

12. The turbine blade as claimed in claim 11, in which the reinforcement is made at least 30%, thinner than a portion of the first ceramic layer underlying the reinforcement.

13. The turbine blade as claimed in claim 1, in which the first ceramic layer has a thickness of 350 μm to 500 μm and/or the reinforcement has a thickness of up to 300 μm.

14. The turbine blade as claimed in claim 13, in which the reinforcement has a thickness of up to 250 μm.

15. The turbine blade of claim 1, wherein a thickness of the first ceramic layer under the reinforcement is the same as a thickness of the first ceramic layer adjacent the reinforcement.

16. The turbine blade of claim 1, further comprising a transitional region adjacent the reinforcement and comprising a gradient in composition between the first ceramic layer and the reinforcement.

17. The turbine blade of claim 16, wherein the transition region extends over an entire pressure side of the airfoil between an inflow edge and an outflow edge.

18. A turbine blade with a ceramic thermal barrier coating system, at least comprising:

a substrate designed as a blade platform and as a blade airfoil, optionally a metallic bond coat on the substrate, wherein on the substrate or optionally on the metallic bond coat there is a thermal barrier coating comprising a first ceramic layer, which protects the substrate for the most part or completely in an exposed high temperature region and there is an increase of thickness in a portion of the thermal barrier coating comprising a second ceramic layer disposed on only a portion of the first ceramic layer and forming a reinforcement of the thermal barrier coating, wherein the second ceramic layer comprises a material composition that is different from a material composition of the first ceramic layer, wherein the reinforcement is arranged over the first ceramic layer, wherein the reinforcement is provided at most on 30% of an area of the blade airfoil and wherein the reinforcement is arranged close to a platform and extends over a pressure side of the airfoil in a direction of flow and with an extent thereto which in a radial direction of the blade airfoil is at most 30% of a full radial extent of the blade airfoil;

wherein a thickness of the first ceramic layer under the reinforcement is less than a thickness of the first ceramic layer adjacent the reinforcement, thereby defining a recess receiving the reinforcement.

* * * * *